United States Patent [19]

Miller

[11] Patent Number: 5,715,073
[45] Date of Patent: Feb. 3, 1998

[54] PROCESSING BY SEPARATE STAGES MONOCHROME DIGITAL IMAGES TO PROVIDE HALFTONE COLOR IMAGES

[75] Inventor: Rodney L. Miller, Fairport, N.Y.

[73] Assignee: Eastman Kodak Company, Rochester, N.Y.

[21] Appl. No.: 383,286

[22] Filed: Feb. 3, 1995

[51] Int. Cl.$^6$ ............................................ H04N 1/46
[52] U.S. Cl. .................. 358/534; 358/518; 358/456; 358/298
[58] Field of Search .................... 358/518, 534, 358/536, 515, 520, 521, 500, 535, 298, 456; 382/162

[56] References Cited

U.S. PATENT DOCUMENTS

| | | | |
|---|---|---|---|
| 4,942,460 | 7/1990 | Inagaki | 358/534 |
| 4,955,065 | 9/1990 | Ulichney | 382/50 |
| 5,051,844 | 9/1991 | Sullivan | 358/456 |
| 5,070,413 | 12/1991 | Sullivan | 358/456 |
| 5,214,517 | 5/1993 | Sullivan et al. | 358/456 |
| 5,231,482 | 7/1993 | Murakami | 358/500 |
| 5,341,226 | 8/1994 | Shiau | 358/534 |
| 5,394,252 | 2/1995 | Holladay et al. | 358/534 |
| 5,426,519 | 6/1995 | Banton | 358/534 |
| 5,473,446 | 12/1995 | Perumal, Jr. | 358/534 |
| 5,541,743 | 7/1996 | Shiomi et al. | 358/534 |
| 5,543,941 | 8/1996 | Parker et al. | 358/534 |
| 5,574,666 | 11/1996 | Ruetz et al. | 364/526 |

OTHER PUBLICATIONS

E.M. Granger, "Uniform Color Space as a Function of Spatial Frequency," *Proc. of the SPIE, Human Vision, Visual Processing, and Digital Display IV*, vol. 1913 (1993) 449–461.

J.C. Stoffel and J.R. Moreland, "A Survey of Electronic Techniques for Pictorial Image Reproduction," *IEEE Tran. Commun.*, vol. 29 (1981) pp. 1898–1924.

*Primary Examiner*—Edward L. Coles, Sr.
*Assistant Examiner*—Madeleine AV Nguyen
*Attorney, Agent, or Firm*—Raymond L. Owens

[57] ABSTRACT

A halftone processing method is disclosed in which, after receiving three or more monochrome digital images which collectively represent a color image having three colors, processing takes place. Processing is by a separate stage for each of the monochrome digital images to provide halftone output images, wherein at least one of the stages uses a different processor algorithm from the other halftone processing stages so as to increase processing speed.

8 Claims, 2 Drawing Sheets

| SOLID COLOR | LUMINANCE (L*) |
|---|---|
| WHITE | 100.0 |
| YELLOW | 97.1 |
| CYAN | 91.1 |
| GREEN | 87.7 |
| MAGENTA | 60.3 |
| RED | 53.2 |
| BLUE | 32.3 |
| BLACK | 15.5 |

| SOLID COLOR | LUMINANCE (L*) |
|---|---|
| WHITE | 100.0 |
| YELLOW | 97.1 |
| CYAN | 91.1 |
| GREEN | 87.7 |
| MAGENTA | 60.3 |
| RED | 53.2 |
| BLUE | 32.3 |
| BLACK | 15.5 |

| SOLID COLOR | LUMINANCE (L*) |
|---|---|
| WHITE | 100.0 |
| YELLOW | 92.9 |
| MAGENTA | 66.6 |
| CYAN | 63.5 |
| GREEN | 55.9 |
| RED | 55.6 |
| BLUE | 32.7 |
| BLACK | 22.7 |

5,715,073

PROCESSING BY SEPARATE STAGES MONOCHROME DIGITAL IMAGES TO PROVIDE HALFTONE COLOR IMAGES

FIELD OF THE INVENTION

This invention relates to halftoning (or multi-toning) of color images, specifically, halftoning color images by processing one color layer at a time using monochrome techniques.

BACKGROUND OF THE INVENTION

Most of the development of halftoning algorithms has been in the context of monochrome imagery. Using these algorithms, color images are simply halftoned by applying the monochrome techniques to each layer of the color image. Typically, the same monochrome technique is applied to each layer of the color image.

Monochrome digital halftoning is well known as a technique for converting continuous tone (contone) images into halftone images consisting of a pattern of equal intensity dots. At each addressable location within the image, i.e., each pixel location, a dot is either turned on or turned off. Some digital halftoning techniques produce periodic patterns of dots and are known generically as ordered dithering. Another popular technique produces patterns of dots which are not periodic, but which are characterized by high-spatial frequencies. This technique is known generically as error diffusion.

In one version of dithering digitized intensity values representing a contone image, typically generated by periodically sampling a contone image using an optical scanner, are converted into halftone cells where each halftone cell corresponds to an intensity value. The number of dots turned on within each halftone cell is proportional to the magnitude of each corresponding intensity value. In another version of dithering, the number of intensity values is equal to the number of pixels in the halftone cell, i.e., equal scanner and printer resolutions. Generally speaking, regardless of the version of dithering, the arrangement of pixels in the halftone image is perceived by a viewer of the halftone image to have a gray scale intensity commensurate with the magnitude of the associated intensity value(s). In the first version of dithering, a bi-tonal halftoning apparatus operates by comparing each intensity value sample to all thresholds in a matrix of thresholds.

In the second version of dithering an intensity value is compared to one threshold in the threshold matrix. The threshold processor is repeated for each intensity value with the threshold matrix replicated across the image in a tile like fashion.

The threshold levels within the threshold matrix are generally arranged in two common forms: clustered dot dithering and dispersed dot dithering. These two arrangements of thresholds produce patterns of dots which exhibit distinctly different spatial frequency characteristics. A type of dispersed dot dithering known as blue noise dithering attempts to spread the noise resulting from the halftoning processor over a range of high frequencies. This usually results in superior image quality since the human visual apparatus is least sensitive to high frequencies. See U.S. Pat. No. 5,214,517 which describes blue noise dither.

For certain display technologies, it is generally accepted that error diffusion related techniques, or neighborhood processors, generate superior image quality compared to dither techniques, or point processors. However, neighborhood processors are more complicated and takes longer to execute in software. In error diffusion, digitized intensity values representing a contone image are converted into on and off dots. The number of dots turned on within an area is proportional to the magnitude of intensity values within the same area. As with dithering, the intensity values are typically generated by periodically sampling a contone image using an optical scanner. In error diffusion the number of intensity values is typically equal to the number of pixels in the output image, i.e., equal scanner and printer resolutions. At each pixel location, a modified intensity value is compared with a threshold, resulting in either a black or white output pixel. The amplitude error represented by the black or white decision is fed back through a 2-dimensional filter and added to the next intensity value. This feedback processor serves to preserve the mean in local areas as well as enhance edges, however, it is also costly and time consuming to implement. The halftoning noise produced by error diffusion in flat regions is naturally predominantly high frequency resulting in superior image quality since the human visual apparatus is least sensitive to high frequencies. The current art is such that typical error diffusion processors produce better image quality than blue noise dither although both have similar noise characteristics.

A typical objection to error diffusion is the visibility of low frequency patterns of dots commonly referred to as worms. There have been many attempts to modify error diffusion to minimize these artifacts such as modulating the threshold and modulating the 2-dimensional filter. One of these modifications introduced the use of a human visual blur function to better predict the perceived gray level after thresholding. U.S. Pat. No. 5,051,844 describes error diffusion with human visual system blur. This usually results in superior image quality because the blur function accurately predicts the visibility of the low frequency artifacts and, therefore, biases the threshold decision to minimize their occurrence.

The problems with the current art is that applying error diffusion to each layer is compute intensive and, therefore, time consuming. However, while applying dither to each layer is faster it also results in lower image quality. Further, in color imagery, the sensation of sharpness and image noise is dominated by those layers which generate the majority of the luminance modulation, since it is well known that in the human visual apparatus the chromatic channels have a significantly lower spatial bandwidth than the achromatic channel. E. M. Granger, "Uniform Color Space as a Function of Spatial Frequency," *Proc. of the SPIE, Human Vision, Visual Processing, and Digital Display IV,* Vol. 1913 (1993) 449–461.

SUMMARY OF THE INVENTION

It is therefore an object of this invention to provide a processor for halftoning color images that minimizes the amount of computation and therefore the time or cost required, while maintaining a high level of image quality.

It is also an object of this invention to maintain a high level of quality in those layers which produce a large luminance modulation.

Another object of this invention is to reduce the processing required to halftone a color image while maintaining a high level of quality.

These objects are achieved by an improved color halftoning processor, comprising the steps of:

a) receiving three or more monochrome digital images which collectively represent a color image having three color layers; and b) processing by a separate stage each of the monochrome digital images to provide halftone output images, wherein at least one of the stages uses a different processor algorithm from the other halftone processing stages so as to increase processing speed.

A feature of this invention is to apply high quality high cost processing to some of the layers of a color image and low quality low cost processing to other layers of a color image as opposed to applying the same processing to all layers. This is done by recognizing the speed and quality differences inherent in each algorithm as well as the impact on color image quality resulting from luminance modulation in each channel. These factors are used in deciding which halftone processors to apply to each layer in such a way so as to minimize the impact on image quality.

ADVANTAGES

An advantage of this invention is that processing resources can be reduced without appreciable loss of image quality. A further feature of this invention is that of increased processing speed.

DETAILED DESCRIPTION OF THE INVENTION

This invention involves applying fast halftoning techniques to some of the layers in the color image and high quality slower techniques to other layers. Typical higher quality techniques are versions of error diffusion and faster lower quality techniques are versions of dither. The error diffusion type techniques are applied to those layers which dominate the luminance modulation and faster lower quality techniques to the other layers. Since the other layers contribute little to luminance modulation the perceived image quality is minimally affected. Typically yellow in a CMY(K) apparatus and blue in a RGB apparatus contribute little to the luminance modulation. In a preferred embodiment, the highest quality is achieved by applying blue noise dither to those layers with low luminance modulation and error diffusion with human visual blur to those layers with high luminance modulation.

Figures 1, 2:
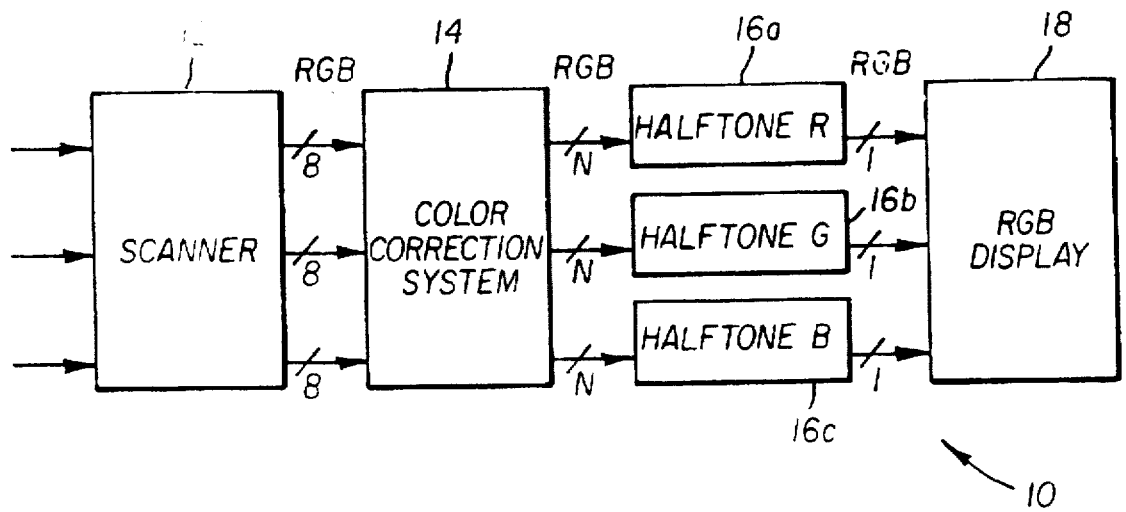
FIG. 1 is a block diagram of an image reproduction apparatus using binary display addressed with additive signals.
FIG. 2 is a table of luminances for solid colors as calculated in the industry standard color space known as CIEL*a*b* for a typical cathode ray tube (CRT)

A color imaging apparatus 10 is shown in FIG. 1 including a scanner 12, color correction system 14 (which can be embodided in either a hard wired system or a computer), three halftone processors 16a–16c (RGB: red, green, blue), and an RGB display 18. The display can typically be a CRT or a printer. The scanner 12 digitizes and quantizes input color image representing each pixel as three 8-bit bytes, where the bytes are shown as associated with red, green, and blue. The color correction system 14 operates on the three bytes simultaneously to produce three new values such that when the color corrected image is halftoned and displayed, the correct colors are produced by the RGB display 18. The quantities produced by the color correction system 14 may have more or less dynamic resolution than 8 bits, i.e., N may be greater or less than 8. The halftone processors 16a–16c, of which there are one for each layer, convert the N-bit-data to binary data. The term layer means a particular color component of an image, for example a red layer, a green layer, or a blue layer. The display device 18 depicts the binary image data at each pixel location, therefore, at any one pixel location there are only eight possible colors which can be displayed, i.e., red, green, blue, cyan, magenta, yellow, white and black.

In a preferred embodiment the halftone processors 16a–16c are not all the same. A processor which produces the best image quality is used on some of the layers and a processor which takes minimal processing resources is used on the other layers. The processors which produce the best image quality are applied to those layers which contribute the most to luminance modulation, and processors which are faster and produce somewhat lower image quality are applied to those layers which contribute less to the luminance modulation. For example, in FIG. 2 are listed typical luminances calculated in CIEL*a*b* space of the eight colors which can be created with a color binary CRT. The average luminance modulation of the red phosphor of the CRT can be evaluated by comparing the luminance differences with red on or off and blue and green held constant, i.e., white minus cyan, magenta minus blue, yellow minus green, and red minus black. From FIG. 2, using the notation $L_w$ for the luminance of white, $L_c$ for the luminance of cyan, etc. the following quantitites can be calculated:

$L_w-L_c=8.9$, $L_m-L_b=28.0$, $L_y-L_g=9.4$, $L_r-L_k=37.7$.

Therefore, the average luminance modulation from the red channel is:

$$\frac{(8.9+28.0+9.4+37.7)}{4.0}=21.0$$

Similarly, for green:

$L_w-L_m=39.7$, $L_y-L_r=43.9$, $L_c-L_b=58.8$, $L_g-L_k=72.2$, and the average luminance modulation from green is:

$$\frac{(39.7+43.9+58.8+72.2)}{4.0}=53.6$$

And finally for blue:

$L_w-L_y=2.9$, $L_c-L_g=3.4$, $L_m-L_r=7.1$, $L_b-L_k=16.8$,

Therefore, the average luminance modulation from blue is:

$$\frac{(2.9+3.4+7.1+16.8)}{4.0}=7.55$$

In a preferred embodiment providing good image quality for this CRT a halftone processor providing good image quality would be applied to the green layer and a faster processor providing lower image quality would be applied to the blue and red layers.

In a preferred embodiment providing the best image quality for this CRT a halftone processor providing good image quality would be applied to the green and red layers and a faster processor providing lower image quality would be applied to the blue layer.

Figures 3, 4:
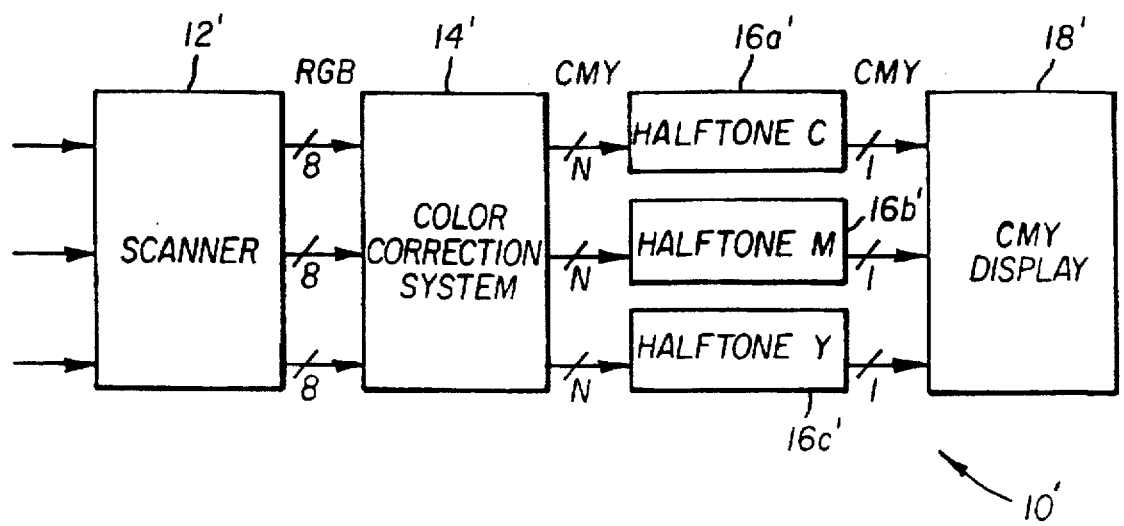
FIG. 3 is a color image reproduction apparatus using binary display addressed with subtractive signals.
FIG. 4 is a table of luminances for solid colors as calculated in CIEL*a*b* for a typical printer.

The above example refers to an additive device controlled by additive signals, i.e., RGB. A similar analysis follows for subtractive apparatus. In FIG. 3, where parts correspond to those in FIG. 1, the same numbers will be used, but they will be primed. A color imaging apparatus 10' is shown to include a scanner 12', color correction system 14', three halftone processors 16a', 16b', and 16c' and a cyan, magenta, yellow display 18' The scanner 12' digitizes and quantizes the input color image representing each pixel as three 8-bit bytes, where the bytes are generally associated with red, green, and blue. The color correction system 14' operates on the three bytes simultaneously to produce three new values such that when the color corrected image is halftoned and printed the correct colors produced by the display 18'. The quantities produced by the color correction system may have more or less dynamic resolution than 8 bits, i.e., N may be greater or less than 8. The halftone processors 16a'–16c', of which there are one for each layer, convert the N-bit data to binary data. The display 18' depicts the binary image data at each pixel location, therefore, at any one pixel location there are only eight possible colors which can be displayed, i.e., red, green, blue, cyan, magenta, yellow, white and black.

In a preferred embodiment using a printer the halftone processors are not all the same. A processor which produces the best image quality is used on some of the layers and a processor which takes minimal processing resources is used on the other layers. The processors which produce the best image quality are applied to those layers which contribute the most to luminance modulation, and processors which are faster and produce somewhat lower image quality are applied to those layers which contribute less to the luminance modulation. For example, in FIG. 4 are listed typical luminances calculated in CIEL*a*b* space of the eight colors which can be created with a color binary printer. The average luminance, modulation of the cyan layer can be evaluated by comparing the luminance differences with cyan on or off and magenta and yellow held constant, i.e., white minus cyan, magenta minus blue, yellow minus green, and red minus black. From FIG. 4, using the notation $L_w$ for the luminance of white, $L_c$ for the luminance of cyan, etc.

$L_w-L_c=36.5$,
$L_m-L_b=33.9$,
$L_y-L_g=37.0$,
$L_r-L_k=32.9$,

Therefore, the average luminance modulation from the cyan channel is $$\frac{(32.9+37+33.9+36.5)}{4.0}=35.1$$

Similarly, for magenta
$L_w-L_m=33.4$,
$L_y-L_r=37.3$,
$L_c-L_b=30.8$,
$L_g-L_k=33.2$,
and the average luminance modulation from magenta is $$\frac{(33.4+37.3+30.8+33.2)}{4.0}=33.7$$

And finally for yellow
$L_w-L_y=7.1$,
$L_c-L_g=7.6$,
$L_m-L_r=11.0$,
$L_b-L_k=10.0$,
Therefore, the average luminance modulation from yellow is $$\frac{(11.0+11.0+7.6+7.1)}{4.0}=9.2$$

For this printer a halftone processor providing good image quality would be applied to the cyan and magenta channels and a faster processor providing lower image quality would be applied to the yellow channel. Although not described here in detail, it will be recognized that a similar analysis could be applied to a 4-channel printer, i.e., CMYK, in which case the halftone processor providing good image quality would be applied to the cyan, magenta and black channels and a faster processor providing lower image quality would be applied to the yellow channel.

In a further preferred embodiment, error diffusion is the high quality halftone processor which is used on some of the layers which contribute the most to luminance modulation and ordered dither is the fast halftone processor used on the other layers. Error diffusion and ordered dither are well known to anybody skilled in the art and are comprehensively reviewed by J. C. Stoffel and J. R. Moreland, "A Survey of Electronic Techniques for Pictorial image Reproduction," IEEE Tran. Commun., Vol. 29 (1981) pp 1898–1924.

In a further preferred embodiment a variation of error diffusion is utilized which is disclosed in U.S. Pat. No. 5,051,844. This embodiment further improves the quality of error diffusion by utilizing an additional blur filter representative of the human visual system to alter the threshold decision.

In a further preferred embodiment a version of ordered dither is utilized in the ordered dither processor as disclosed in U.S. Pat. No. 5,214,517. This version of ordered dither produces a periodic pattern of dots at all gray levels which tends to minimize low spatial frequency content and is therefore referred to as blue noise dither.

Although the above discussion has been in reference to binary output devices and therefore binary halftone processors, this invention could just as easily be applied to an apparatus utilizing a multilevel printer and correspondingly multi-tone processors.

The invention has been described in detail with particular reference to certain preferred embodiments thereof, but it will be understood that variations and modifications can be effected within the spirit and scope of the invention.

PARTS LIST
10 color imaging apparatus
12 scanner
14 color correction system
16a halftone processor
16b halftone processor
16c halftone processor
18 display

I claim:

1. Improved color halftoning processing, comprising the steps of:
    a) receiving three or more monochrome digital images which collectively represent a color image having three color layers; and
    b) processing by a separate stage for each of the monochrome digital images to provide halftone output images, wherein at least one of the stages uses a different processor algorithm from the other halftone processing stages so as to increase processing speed; and c) those layers with high luminance modulation are processed with one type of halftone algorithm and those layers with low luminance modulation are processed with a different type of halftone algorithm.

2. The method of claim 1 wherein those layers with high luminance modulation are processed with error diffusion halftone processing and those layers with low luminance modulation are processed with ordered dither halftone processing.

3. The method of claim 2 wherein the ordered dither halftone processing consists of blue noise dither.

4. The method of claim 2 wherein the error diffusion halftone processing consists of error diffusion with human visual blur.

5. The method of claim 1 wherein those layers with high luminance modulation are red and green and the layer with low luminance modulation is blue.

6. The method of claim 1 wherein the layers with high luminance modulation are green and those layers with luminance modulation are red and blue.

7. The method of claim 1 wherein those layers with high luminance modulation are cyan and magenta and the layer with low luminance modulation is yellow.

8. The method of claim 1 wherein those layers with high luminance modulation are cyan, magenta, and black and the layer with low luminance modulation is yellow.

* * * * *